United States Patent [19]

Beamon, III

[11] Patent Number: 4,897,715

[45] Date of Patent: Jan. 30, 1990

[54] HELMET DISPLAY

[75] Inventor: William S. Beamon, III, Ormond Beach, Fla.

[73] Assignee: General Electric Company, Syracuse, N.Y.

[21] Appl. No.: 264,621

[22] Filed: Oct. 31, 1988

[51] Int. Cl.$^4$ .......................... H04N 7/18; H04N 9/14; H04N 3/08; H04N 13/00

[52] U.S. Cl. ....................................... 358/93; 340/705; 350/6.5; 358/3; 358/53; 358/63; 358/88; 358/104; 358/199; 358/206; 358/230; 358/241

[58] Field of Search ................... 358/3, 53, 60, 63, 87, 358/88, 93, 103, 104, 199, 200, 206, 230, 240, 241, 113; 340/705; 350/6.5, 6.6

[56] References Cited

U.S. PATENT DOCUMENTS

| | | | |
|---|---|---|---|
| 3,760,096 | 9/1973 | Roth | 358/63 |
| 3,941,923 | 3/1976 | Wheeler | 358/113 |
| 4,003,080 | 1/1977 | Maiman et al. | 358/87 |
| 4,028,725 | 6/1977 | Lewis | 358/103 |
| 4,097,115 | 6/1978 | Garwin et al. | 350/6.7 |
| 4,297,723 | 10/1981 | Whitby | 358/87 |
| 4,311,999 | 1/1982 | Upton et al. | 340/755 |
| 4,340,888 | 7/1982 | Seroskie | 358/113 |
| 4,349,815 | 9/1982 | Spooner | 340/705 |
| 4,437,113 | 3/1984 | Lee et al. | 358/93 |
| 4,445,126 | 4/1984 | Tsukada | 346/108 |
| 4,474,422 | 10/1984 | Kitamura | 350/6.8 |
| 4,547,038 | 10/1985 | Mori | 358/6.6 |

FOREIGN PATENT DOCUMENTS

| | | | |
|---|---|---|---|
| 8203923 | 11/1982 | PCT Int'l Appl. | 340/705 |
| 1489758 | 10/1977 | United Kingdom . | |

OTHER PUBLICATIONS

"A helmet mounted sight system for fighter aircraft"; by Stephenson et al; GEC Journal of Science & Technology, vol. 46, No. 1 (1980) pp. 33-38.

Bruce J. Schachter, *Computer Image Generation*, pp. 123-124, John Wiley & Sons, 1983.

Primary Examiner—John W. Shepperd
Assistant Examiner—Michael D. Parker
Attorney, Agent, or Firm—Paul Checkovich; Stephen A. Young

[57] ABSTRACT

A helmet mountable display system includes separate optical paths for providing a respective image to the left and right eye of an observer for stereoscopic viewing. Each of a first and second plurality of spaced apart, substantially point light sources supply a respective group of modulated rays of light. The rays of each group are collimated by a respective input lens and the collimated rays from each input lens are directed so that their envelopes all intersect at the same point. A horizontal and a vertical deflecting surface are disposed on opposite sides of the intersection point. Electromechanical drivers move the surfaces which scan all the collimated rays. The scanned rays from each group are focused onto a respective screen by a respective output lens to form a raster scanned image. The screens are divided into a plurality of contiguous zones with a ray from each light source assigned to a corresponding zone, which reduces the vertical scan angle excursions required. Simultaneous scan lines from the rays are displayed in each zone on the screen which reduces the video bandwidth requirement of the system. The image from the screens is supplied to the inside surface of a visor from which it is reflected to a corresponding eye of the observer.

28 Claims, 4 Drawing Sheets

HELMET DISPLAY

BACKGROUND OF THE INVENTION

This invention relates to helmet mountable displays, ard, more particularly, to a self-contained, full color, wide angle, light weight, inexpensive, stereoscopic, high resolution helmet mountable video display, such as may be used in simulation systems like trainers, or during actual vehicle or aircraft operation as a display for sensors and/or instruments.

One type of helmet display system using helmet mounted CRT's, head and eye tracking, and an optical lens system with a beam splitter for rendering a desired image is shown and described in U.S. Pat. No. 4,028,725 - Lewis. Another type involving a projection onto a screen using optical guide with rotary joints and a counterbalance for relieving weight from the pilot's head is illustrated and described in U.K. Patent Specification 1,489,758.

Yet another type, which employs a separate fiber optic light guide for generating each line of a raster, is shown and described in U.S. Pat. No. 4,349,815 - Spooner. For the latter system, as the number of lines increases, granularity may be expected to increase and overall quality of the image may be expected to decrease, since it is difficult to maintain uniform optical characteristics among all the light guides.

U.S. Pat. No. 4,097,115 - Garwin et al illustrates an optical scanning device that uses a plurality of light sources for producing adjacent lines in a band for a display. Light from the sources is reflected onto a screen by a horizontally deflecting element and the reflected image from the screen is reflected by a vertically deflecting element to an observer. Focusing an image on the screen limits the field of view (FOV) obtainable from the device. Further, using a plurality of light sources to portray adjacent lines of the same band does not significantly reduce the bandwidth of the vertical scan. Also, it is not clear whether stereoscopic vision can be obtained from images reflected from the single screen, since the screen is provided with a textured surface stated to provide a controlled degree of scattering power.

It would be desirable to provide a helmet mountable display system that overcomes the disadvantages and inconveniences of the known art. Further, it would be desirable to use an electro-mechanical scanning system wherein the physical scan requirements are reduced over those of known systems.

Accordingly, it is an object of the present invention to provide a helmet-mountable display system that is light-weight and inexpensive, and that provides a full color, high resolution wide-angled image to a viewer.

Another object is to provide a stereoscopic image display system having an electro-mechanical scanning system wherein any scan anomaly affects each eye's image equally to assure registration of the images.

Still another object of the present invention is to provide an image display system having an electro-mechanical scanning system incorporating multiple simultaneous scan lines for reducing video bandwidth and physical scan angle requirements.

SUMMARY OF THE INVENTION

In accordance with the present invention, a helmet mountable display system for displaying a raster-scanned image in response to a plurality of light source means for supplying respective light signals comprises a first optical path including input lens means optically coupled to the light source means for providing a collimated light pattern in response to the light signals, a first movable deflecting surface for deflecting the collimated light pattern in a first direction along a predetermined optical path, a second movable deflecting surface for deflecting the deflected collimated light pattern in a second direction along the optical path, output lens means for focusing the deflected collimated light pattern from the second surface and screen means disposed at the output image plane of the output lens means for displaying the raster-scanned image in response to the focused light pattern from the second surface. The display system further includes a visor having a visor surface viewable by the observer and relay lens means disposed between the screen and the visor for transporting the image from the screen to the visor surface. The image is reflected from the visor surface to the observer. The raster scanned image on the screen is divided into a plurality of contiguous zones, and a corresponding light signal is assigned to each zone for scanning a predetermined number of lines of the raster scanned image, thereby reducing mechanical and video bandwidth requirements.

A second optical path analogous to the first optical path, wherein the first and second movable deflecting surfaces and the visor display means are in common may be provided for supplying a second raster scanned image to the observer. The first and second raster scanned images are supplied to respective eyes so that a stereoscopic display is presented to the observer.

In another aspect of the present invention, a method for generating a raster scanned image from video information for defining the image includes modulating a respective light signal for each of a predetermined plurality of contiguous zones of the image in response to a respective predetermined portion of the video information for forming respective modulated light signals, collimating the modulated light signals, deflecting the collimated modulated light signals by a first moveable deflector surface in a first direction for forming first deflected collimated modulated light signals, deflecting the first deflected light signals by a second moveable deflector surface in a second direction for forming second deflected collimated modulated light signals, respective ones of the second light signals indicative of a respective line for each of the zones, and focusing the second light signals, wherein the focused second deflected light signals are representative of the raster scanned image.

The lines for each zone may be scanned in one direction only or from alternating directions. Further, the lines may be scanned sequentially or alternately with interleaving.

In yet another aspect of the present invention, visual display apparatus for generating a raster scanned image from video information for defining the image includes, a plurality of light source means for supplying a respective modulated light signal to a corresponding one of a plurality of contiguous zones of the image wherein each light signal is modulated in response to a respective portion of the video information. The apparatus also includes collimation means with an input coupled to the plurality of light source means for providing collimated modulated light signals, first and second deflecting surfaces moveable about first and second axes, respectively, and focusing means having an input optically coupled to the second deflecting surface for receiving collimated light signals deflected from the second deflecting surface for focusing the collimated light signals received from the second deflecting surface. The first deflecting surface is optically coupled with the collimation means so that the collimated light signals are incident on the first surface and is further disposed with respect to the second deflecting surface such that collimated light signals incident on the first surface are deflected onto the second surface. The focused light signals from the focusing means are representative of the raster scanned image when the first and second surfaces are moving in a predetermined pattern, such as oscillating.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
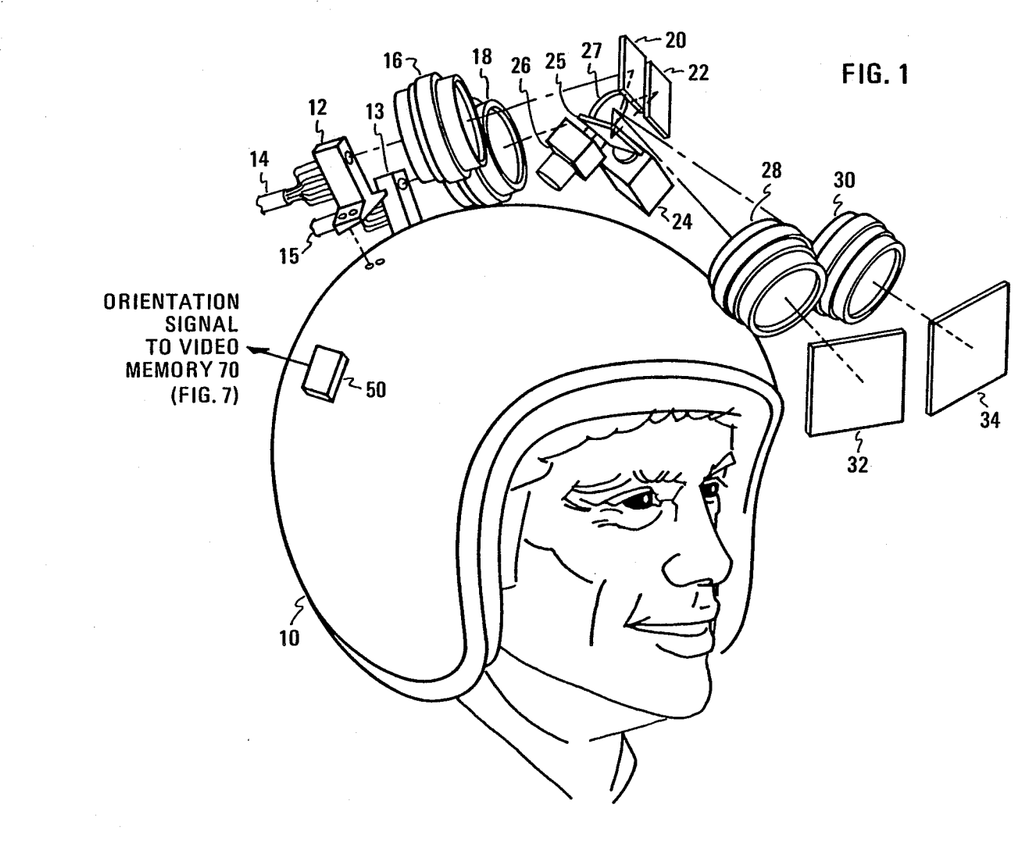
FIG. 1 is a schematic diagram of a helmet mountable display system in accordance with the present invention.

Referring to FIG. 1, a schematic diagram of a helmet mountable display system in accordance with the present invention is shown. In order to present a stereoscopic image to an observer, the display system includes a right and left optical path that ultimately produce a separate image for the right and left eye. The right and left optical paths cross each other at a point along the respective optical paths. Thus the terms "right" and "left", as used herein when referring to components disposed along the optical paths, are referenced to the image produced for the right and left eye respectively, unless otherwise stated.

The display system comprises fiber support means 12 and 13, input lens means 16 and 18, folding, or redirecting, mirror means 20 and 22, vertical scan means 24, including vertical scanning mirror means 25, horizontal scan means 26, including horizontal scanning mirror means 27, output lens means 28 and 30, and rear projection screen means 32 and 34. The display system also includes a right folding mirror 62, right relay lens means 64, a beam splitter 68 and a visor 60 which are shown in detail in FIG. 2. All the foregoing components of the display system are securely mounted or fastened to helmet 10 and are appropriately oriented and aligned along the corresponding right and left optical paths as hereinafter described.

The terms "horizontal" and "vertical" are conventionally used when referring to square or rectangular raster-scanned images. However, the present invention is not limited to only true horizontal and vertical scans but will operate with a scan having orthogonal scan directions in any spatial orientation.

Fiber support means 12 and 13 each receive a respective plurality of optical waveguides or fibers 14 and 15. The actual number of fibers is equal to the number of zones from which the ultimate image is formed. For the present description, eight fibers 14 and eight fibers 15 will be used, it being realized that a greater or lesser number may be employed.

The left optical path for producing the image for the left eye will be described, it being understood that the right optical path for producing the image for the right eye may be analogously constituted. Fibers 14 are fixedly held at their ends by support 12 so that the ends of fibers 14 are linearly arranged, such as in a row or column. The row or column of ends of fibers 14 is disposed at an angle with respect to the horizontal when helmet 10 is in a predetermined position, such that the image of the fiber ends is sensed as vertical at the output image plane on screen 34 by an observer wearing helmet 10. The actual orientation of the ends of fibers 14 is not necessarily vertical when the desired image orientation is vertical and helmet 10 is in the predetermined position due to optical rotation that may occur along the optical path such as from the action of folding mirror 20.

Each end of the plurality of fibers 14 emits light in a conical pattern that diverges from the end of each of fibers 14 and is directed onto lens 16. Each end of fiber 14 acts as a substantially point source of light, so that the output of lens 16 is collimated. Lens means 16 may be a single lens having the desired optical characteristics (convex-convex having the same forward and reverse focal length is presently preferred) or include a lens system having a plurality of optical elements, such as lenses, prisms, etc., that in combination provide the desired optical characteristics from the input to the output of lens means 16. The ends of fibers are further disposed to lie at the reverse focal point of lens means 16.

The collimated output light rays from lens means 16 are directed onto folding mirror means 20 for folding the optical path and decreasing the linear straight line distance required for the overall optical path. Folding mirror means 20 includes a planar reflecting surface which is disposed so that it reflects light incident on it according to well-known physical principles. The reflecting surface is further disposed so that the light reflected therefrom is directed generally toward input lens means 16 and fibers 14 in order to shorten the overall length of the optical path over the linear path which would be required if no folding of the light rays was employed. This shortened optical path facilitates placement and mounting of the display system on helmet 10.

Collimated light reflected from folding mirror 20 is intercepted by and reflected or deflected by vertical scanning mirror 25 of vertical scanning means 24. In a presently preferred embodiment, scanning means 24 is a linear, closed-loop controlled, galvanometer scanner such as is available from General Scanning, Inc. Mirror 25 is oscillated to produce a linear vertical ramp at a desired frequency, such as 60 Hz or the prevailing electrical power system frequency. The required angular deflection of mirror 25 about a predetermined oscillatory reference axis of mirror 25 is determined by the desired size of image 40 to be displayed. Synchronization circuitry (not shown) for controlling the oscillatory rate and angular displacement of mirror 25 may be connected to scanning means 24 as is known in the art.

Collimated light reflected from mirror 25 is intercepted and deflected or reflected by horizontal scanning mirror 27 of horizontal scanning means 26. In a presently preferred embodiment, scanning means 26 is a torsional pendulum type of a general scanning galvanometer such as is available from General Scanning, Inc.

Mirrors 25 and 27 are disposed proximate the forward focal point of lens means 16. Mirror 27 forms a sinusoidal horizontal sweep at a desired frequency, such as about 3937.5 Hz, when the image raster is divided into eight contiguous bands, each band having 125 lines for a total of 1000 lines, for example. Synchronization circuitry (not shown) for controlling the oscillatory rate and angular displacement of mirror 27 may be connected to scanning means 26 as is known in the art. The horizontal sweep frequency is inversely proportional to the number of bands of the image raster. Thus, if four zones or bands are used, the horizontal sweep frequency would be doubled while if sixteen bands were to be used, the horizontal sweep frequency would be halved from that of eight bands. For a single source sweeping the entire raster, such as is typically used for a CRT display, the horizontal sweep frequency would be 31, 500 Hz.

Vertical scanning means 24 and horizontal scanning means 25 as presently preferred are common to both the right and left optical paths and their order along the right and left optical paths is not critical. That is, scanning means 24 and 25 may be disposed such that light deflected from folding mirrors 20 and 22 first strikes scanning mirror 27 of horizontal scanning means 25 and is then reflected onto scanning mirror 25 of vertical scanning means 25 before being directed into lens means 30 and 28, respectively. Of course, mirrors 25 and 27 would still be disposed proximate the forward focal points of the light rays from lens means 16.

In order to provide horizontal scan lines of the raster that are more linear, only a portion of the sinusoidal horizontal sweep may be used. Approximately 15% of the horizontal scan cycle distance (i.e. about 35% of the cycle time) may be blanked to provide more linear scan lines. The total blanking may be equally divided from the maximum and minimum points toward the center of the sinusoid so that only the central portion of the sinusoid is used for the horizontal sweep.

When the image is divided into eight zones and a scan line for each zone is used for image generation, a unidirectional horizontal sweep may produce 1000 scan lines per frame. A bi-directional horizontal sweep may be used to increase the number of scan lines available in a predetermined interval so that 1000 lines non-interlaced or 2000 lines interlaced or 1000 lines interlaced may be obtained when the horizontal sweep frequency is 2000 sweeps/second. Of course, other numbers of scan lines per frame, such as 525, may be used.

The collimated light reflected from mirror 27 is directed through lens means 30 which may be the same as lens means 16. Lens means 30 focuses and directs light passing therethrough toward rear projection screen 34. Lens means 30 is disposed with respect to mirrors 25 and 27 such that mirrors 25 and 27 are proximate the reverse focal point of lens means 30. Rear projection screen 34 is disposed at a distance from lens 30 equal to the forward focal length of lens 30 and further disposed to intercept the light which has passed through lens 30, so that an image of the end of each of fibers 14 is formed on a respective zone of screen 34. Screen 34 may be a rear projection screen such as is available from Beattie Systems, Inc.

Figure 2:
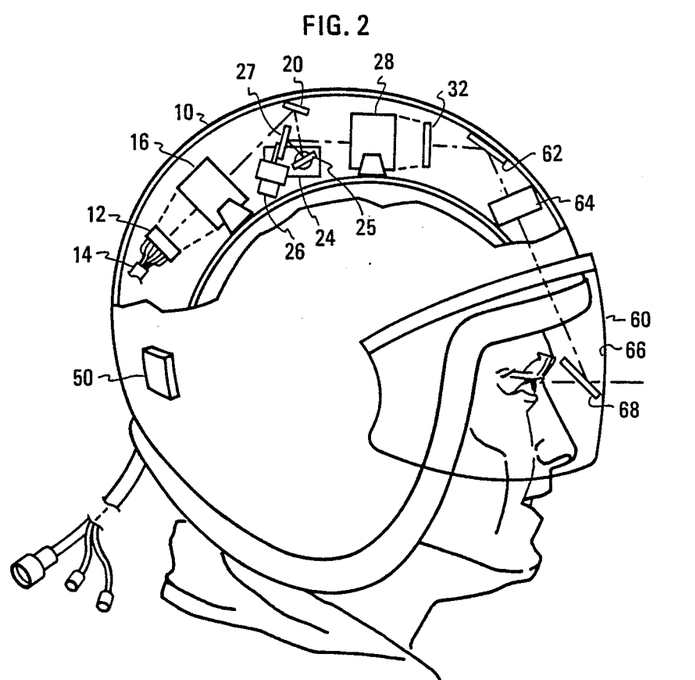
FIG. 2 is a schematic diagram of the helmet mountable display system of FIG. 1 showing additional features in accordance with the present invention.

Referring to FIG. 2, a schematic diagram of the helmet mountable display system of FIG. 1 depicting additional features in accordance with the present invention is shown. Optical system components mounted on the right hemisphere of an inner shell of helmet 10 surrounded by an outer shell 11 of helmet 10 are shown.

Optically coupled to rear projection screen 32 is a planar folding mirror 62 which receives the image from screen 32 and directs it through relay lens means 64. After passing through relay lens means 64, the image is directed onto a surface of a beam splitter 68. Relay lens means 64 translates the image from rear projection screen 32 by way of folding mirror 62 and beam splitter 68 onto the inner surface 66 of visor 60, while maintaining the desired focus and size of the image. Relay lens means 64 may be a single lens having the desired optical characteristics or include a lens system having a plurality of optical elements such as lenses, prisms, etc., that in combination provide the desired optical characteristics from the input to the output of lens means 64.

Beam splitter 68 reflects the image incident thereon from relay lens 64 onto the reflecting inner surface 66 of a visor display system 60, such as is available from Farrand. Inner surface 66 is generally spherical and reflects the image incident thereon back to the right eye of the observer through beam splitter 68. Typically about 50 percent of the light incident on beam splitter 68 is reflected and the remaining about 50 percent of the light incident on beam splitter 68 passes directly therethrough when planar beam splitter 63 is oriented at about 45° with respect to the central axis of relay lens 64. Thus, typically folding mirror 62 is substantially parallel to beam splitter 68.

Spherical inner surface 66 of visor 60 collimates the image reflected therefrom. That is, the image reflected from surface 66 appears to the observer as if it originated at an infinite focal point.

It is to be understood that a folding mirror (not shown) analogous to mirror 62 and relay lens means (not shown) analogous to relay lens means 64 are similarly disposed for presenting an image to the left eye of the observer. Beam splitter 68 may be a single unit having enough lateral extent to intercept the image from the left folding mirror and right folding mirror 62 and from inner surface 66 of visor 60. When the images from screen 32 and 34 (FIG. 1) are reflected from the inner surface 66 of visor 60, a stereoscopic display is presented to the observer.

Visor 60 reflects a substantial portion, say about 90 percent, of light from screens 32 and 34 (FIG. 1) incident on the inner surface 66 for viewing by the observer, while also permitting a smaller portion, say about 9 percent, of light incident on the outer surface thereof from the surroundings to be passed through for viewing by the observer. The light passed through visor 60 from the surroundings permits instruments and out-the-window scenes to be observed.

The image from the output lens means 28 and 30 (FIG. 1) may also be projected directly or through an appropriate lens system onto a display screen, such as a hemispherical dome, if desired.

Referring again to FIG. 1, the size and characteristics of rear projection screen 34 are determined from the input requirements of the visor display system 60. For one particular visor system, the required input image, i.e. the image formed on screen 34, was determined to be 11.2 mm vertical by 15.4 mm horizontal so that to accommodate 1000 scan lines a spot or pixel size of about 11.2 to 15 microns is needed.

Head tracker means 50, which is fixedly coupled to helmet 10, provides an orientation signal indicative of the orientation of helmet 10 relative to true horizontal and vertical as is known in the art. The information available from the orientation signal from head tracker means 50 is used for selecting the appropriate video information for presentation to the display system.

An analogous optical path is provided from the plurality of fibers 15 that are fixedly held at their ends by support means 13, through lens means 18, through the sequential reflections of folding mirror 22, vertical scanning mirror 25 and horizontal scanning mirror 27, through lens means 28 onto rear projection screen 32 and to visor 60 via folding mirror 62 (FIG. 2), relay lens means 64 (FIG. 2) and beam splitter 68 (FIG. 2). Further, components similar to those of the first described optical path may be used. That is, support means 13 may be similar to support means 12, lens means 18 may be similar to lens means 16, folding mirror means 22 may be similar to folding mirror means 20, lens means 28 may be similar to lens means 30, rear projection screen 32 may be similar to rear projection screen 34.

Vertical scanning means 24 and horizontal scanning means 26, along with their respective associated scanning mirrors 25 and 27, are common to both optical paths. This is not only economical but also serves a practical purpose. Because vertical scanning mirror 25 and horizontal scanning mirror 27 are each disposed to intercept both optical paths at respective first and second predetermined distances along the paths, the ultimate image presented to the left and right eye is synchronized. Further, no phase shift between the optical paths will occur due to scanning mirrors 25 and/or 27 because whatever perturbation may be introduced by mirror 25 and/or mirror 27, such as may be expected from vibration for example, will equally affect the light pattern (and ultimately both the left and right image) of both optical paths.

Orientation and arrangement of the ends of fibers 14 and 15 in supports 12 and 14, respectively, are determined by the desired orientation of the image of the ends of fibers 14 and 15 on rear projection screen 34 and 32, respectively. Generally, it is desired that the image of the ends of fibers 14 and 15 be vertical as sensed by an observer wearing helmet 10. Typically, the orientation of the ends of fibers 14 and 15 will not also be vertical since it is necessary to compensate for offset and/or optical rotation of the light caused by components of the optical paths as it traverses the optical paths. Folding mirrors 20 and 22 generally contribute to optical rotation in each respective optical path.

In one embodiment of the present invention, lens means 16 and 18 have the same forward focal length and lens means 28 and 30 have the same reverse focal length. Further, the forward and reverse focal lengths of lens means 16, 18, 28 and 30 may all be the same. In addition, lens means 16, 18, 28 and 30 are arranged so that there is a 1:1 correspondence between the ends of fibers 14 and 15 and the image of the fiber ends on screens 34 and 32.

Figure 3:
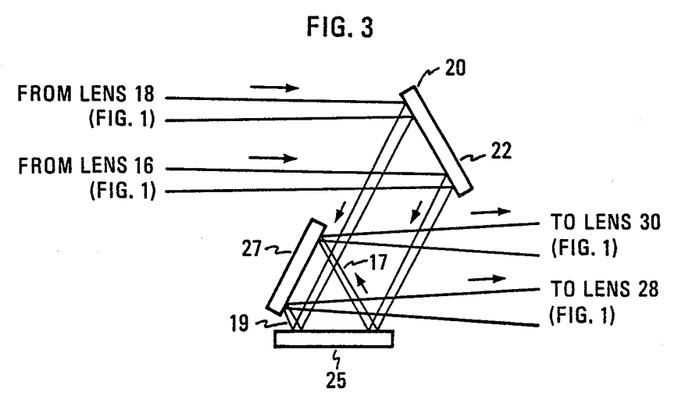
FIG. 3 is a schematic diagram of a portion of the optical system of the display system of FIG. 1.

Referring to FIG. 3, a plan view of a portion of the optical paths of FIG. 1, not necessarily to scale, is shown. It is to be understood that in the view shown, folding mirror 20 is nearer the viewer while folding mirror 22 is behind mirror 20 (i.e. into the paper).

Light from lens means 16 and 18 (FIG. 1) is intercepted and reflected by folding mirror 20 and 22, respectively, onto vertical deflecting mirror 25. Mirror 25 reflects light incident thereon onto horizontal deflecting mirror 27 which then directs light incident thereon toward lens 28 and 30 (FIG. 1).

Mirrors 25 and 27 are disposed along the optical paths from lens means 16 and 18 (FIG. 1) to be proximate the forward focal points of lens means 16 and 18. Further, lens means 16 and 18 (FIG. 1) are disposed so that the respective optical paths along which light passing through lens means 16 and 18 is directed cross near the respective focal points of lens means 16 and 18, as is shown more clearly in the view of the optical paths illustrated in FIGS. 4 and 5.

Since folding mirrors 20 and 22, and mirrors 25 and 27 are planar, the point along the optical paths from lens means 16 and 18 where the envelope of the light rays is most constricted represents the focal point of lens means 16 and 18. Focal point 17 of lens 16 and focal point 19 of lens 18 are identified. The exact location of focal points 17 and 19 with respect to mirrors 25 and 27 is not critical, however, mirrors 25 and 27 must be disposed so that they both intercept both optical paths. Further, it is desired to keep the optical paths from the inputs to mirrors 20 and 22 to the output of mirror 27 as short as possible in order to capture all the light from the plurality of intersecting beams with small deflecting mirrors.

Figure 4:
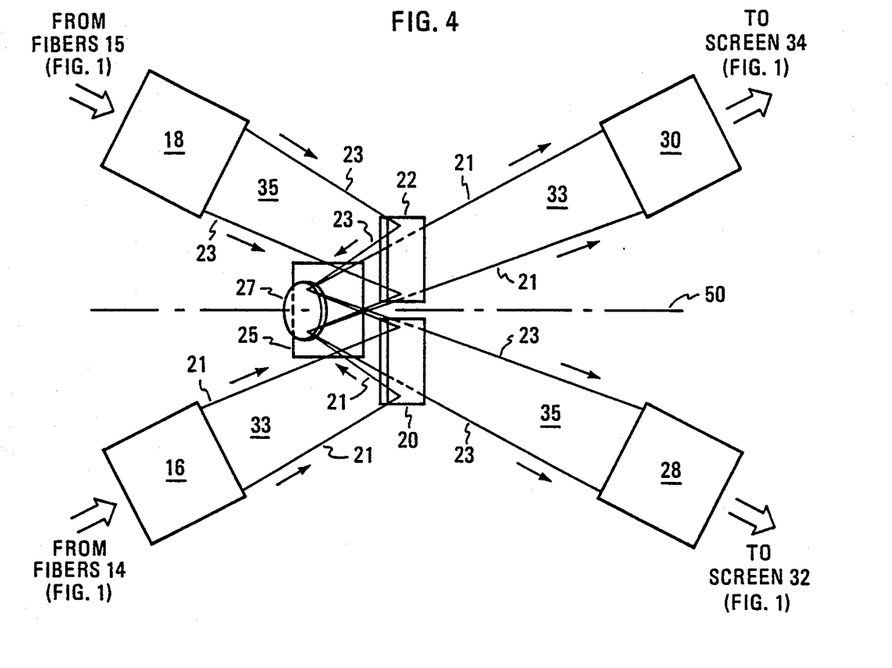
FIG. 4 is a schematic diagram of a portion of the unfolded optical flow path of the display system of FIG. 1.

Referring to FIG. 4, a schematic view, not necessarily to scale, of the display system of FIG. 1 looking onto the top of helmet 10 is shown. In order to simplify the presentation, individual light paths from the ends of fibers 14 and 15 (FIG. 1) are not illustrated, but the outer margins 21 and 23 along light paths 33 and 35 representing the outer envelope of the light rays along light paths 33 and 35 from the ends of fibers 14 and 15, respectively, are shown. Further, the actual optical paths between the output of mirrors 20 and 22 and the output of horizontal mirror 27, which are shown in detail in FIG. 2, are not shown in detail in FIG. 3 to avoid cluttering the drawing.

Central axis 50 divides the display system into two sides or hemispheres. Lenses 18 and 30, and mirror 22 lie in the left hemisphere as referenced to a viewer wearing helmet 10, and lenses 16 and 28, and mirror 20 lie in the right hemisphere. Mirrors 25 and 27 are generally centrally disposed along axis 50. As illustrated, optical paths 33 and 35 cross in the vicinity of vertical mirror 25 and horizontal mirror 27, which is also in the vicinity of the forward focal points of lenses 16 and 18.

Mirrors 25 and 27 are disposed along optical paths 33 and 35 as close as is practical to the forward focal points of lenses 16 and 18, it being understood that clearance between mirrors 25 and 27 must be provided to permit unimpeded physical motion, such as oscillatory motion, of mirrors 25 and 27. Further, mirrors 25 and 27 must intercept all light rays bounded by margins 21 and 23. Because optical paths 33 and 35 intersect and cross each other, images defined by light rays from right hemisphere fibers 14 (FIG. 1) will appear on left hemisphere screen 34 (FIG. 1), and images defined by light rays from left hemisphere fibers 15 (FIG. 1) will appear on right hemisphere screen 32 (FIG. 1).

Figure 5:
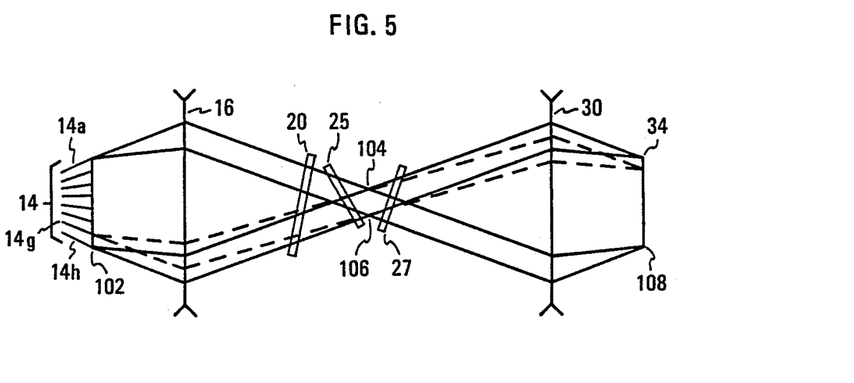
FIG. 5 is a schematic diagram of another portion of the unfolded optical path of the display system of FIG. 1.

Referring to FIG. 5, an unfolded optical schematic, not necessarily to scale, for one eye in accordance with the present invention is shown. Parallel lenses 16 and 30 are part of the imaging system having a predetermined magnification, such as 1:1, which transfers the illuminated image of the ends of fibers 14 through the system and focuses them on screen 34. The ends of fibers 14 lie along the image input plane 102 of input lens 16, which plane includes the focal point of lens 16, while screen 34 is disposed at the output focal plane of output lens 30. Light beams from ends of fibers 14, which are conical, are collimated between lenses 16 and 30, so that collimated beams are scanned by vertical scanning mirror 25 and horizontal scanning mirror 27.

Eight fibers 14, individual ones designated 14a, ... 14h, were selected for one embodiment of the present invention. The eight equally spaced fibers 14, having their ends lying along input image plane 102, are systematically and symmetrically angled outward from a central axis through the midpoints of lenses 16 and 30 so that each of the eight collimated rays, which are each cylindrical, cross in the center (for 1:1 overall image ratio) between lenses 16 and 30 with the envelopes of the rays intersecting at points 104 and 106. Light from ends of fibers 14 is emitted in a cone. The envelope from the ends of fibers 14a and 14h are indicated by a solid line and the envelope from the end of fiber 14g is indicated by a broken line. It is noted that the envelopes from adjacent ends of fibers 14, say fibers 14g and 14h, overlap each other so that at lens 16 the overlap is about one-half the width of the envelop of the cone.

A point source of light, i.e. end of fibers 14, disposed at focal plane 102 of input lens 16 will produce a collimated beam from the output of lens 16. When the collimated beam from lens 16 enters output lens, or decollimating means, 30, it is focused, or decollimated, to a point at the focal plane output 108 of lens 30, at which screen 34 is disposed. In this way, the image of the ends of fibers 14 is transferred to screen 34. In a system using an overall 1:1 magnification ratio, the size of the image of an end of fiber 14 on screen 34 is the same as the size of the end of fiber 14 which produces the image.

The diameter of the collimated beam between lenses 16 and 30 depends on the apex angle of the cone of light from the fiber (Numerical Aperture (NA) characteristic of fiber is equal to the size of one-half the apex angle of the cone) and the focal length of the lens.

Small scan mirrors 25 and 27 may be disposed on proximate intersection points 104 and 106 for intercepting the collimated beams from each of fibers 14. Small mirrors have less mass and inertia and are therefore easier to drive fast with galvanometer scanners than are larger ones. In addition, the components along the optical path for the other eye (not shown in FIG. 4) are arranged so that the envelope of the collimated beams from ends of fibers 15 (FIG. 1) also intersect at points 104 and 106, enabling scanning to occur simultaneously for both eyes.

Scan mirrors 25 and 27 are closely spaced together and are as small as practical while still ensuring that all sixteen collimated light beams are entirely intercepted by each one. Mirrors 25 and 27 are disposed on opposite sides of crossover points 104 and 106 so that the collimated beams fall within the reflecting portion of mirrors 25 and 27 at all expected scan angles. Folding mirror 20 shortens the optical path between ends of fibers 14 and screen 34.

Scan angles and position of mirrors 25 and 27 are a function of the focal length of lenses 16 and 30 and the desired size of the raster on screen 34. Rotational axes of mirrors 25 and 27 should be perpendicular to the beams that they intercept for minimizing raster format distortion as the beams are scanned. Inasmuch as vertical scanning mirror 25 only displaces the intercepted light beams over one-eighth of the raster, vertical scanning mirror 25 may be situated closer to input lens 16, which results in a smaller size requirement for horizontal scanning mirror 27.

The light path from ends of fibers 15 and including lenses 18 and 28 and screen 30 may be analogously arranged.

Figure 6:
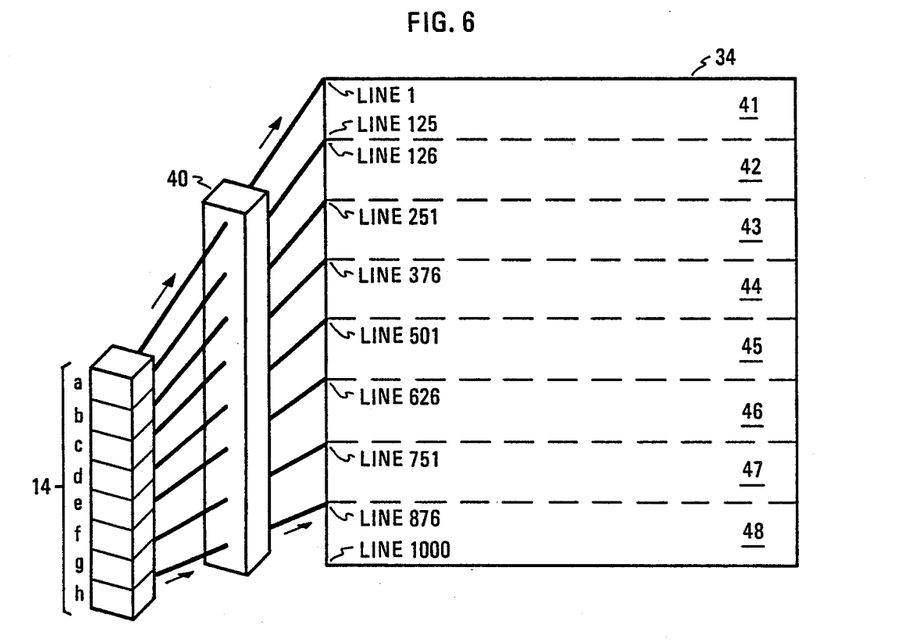
FIG. 6 is a schematic diagram of an image display in accordance with the present invention.

Referring to FIG. 6, a schematic diagram of a portion of the display system of FIG. 1 is shown. The image path from eight individual fibers 14a to 14f of fibers 14 (FIG. 1) to screen 34, which ultimately displays an image to the left eye of a viewer wearing helmet 10 (FIG. 1) is illustrated. It is to be understood that the image path from fibers 15 (FIG. 1) to screen 32 is analogous.

The optics of the image path from individual fibers 14a to 14f of fibers 14 (FIG. 1) to screen 34 include lenses 16 and 30 (FIG. 1), folding mirror 20, vertical scan mirror 25 and horizontal scan mirror 27 that are collectively represented by block 40. It is noted that screen 34 is divided into eight contiguous bands, or zones, 41 to 48, that are disposed in a horizontal direction, each zone for displaying a portion of the image. There are a corresponding equal number (i.e. eight) of fibers 14a–14f for providing video information to respective zones. Thus fiber 14a supplies video information in the form of a modulated light signal for zone 41, fiber 14b for zone 42, and so on. In addition, zones 41–48 are marked to indicate the line numbers of a raster having 1000 lines per frame. For eight zones and a raster having 1000 lines per frame, each zone contributes 125 lines. Thus, zone 41 includes lines 1–125, zone 42 lines 126–250, and so on.

The actual image to be displayed on screen 34 is formed by modulated light emitted from the ends of fibers 14a–14f. The optics of the image path from individual fibers 14a–14f of fibers 14 (FIG. 1) to screen 34, are arranged so that an image of each individual end of fibers 14a–14f is formed on screen 34 when screen 34 is appropriately disposed at the focal point of lens 30 (FIG. 1). That is, light output from each end of fibers 14a–14f spreads out in a cone, which is then collimated by input lens 16, subjected to scanning by vertical scanning means 24 and horizontal scanning means 26, and is re-imaged to the size of a pixel point on screen 34 by output lens 30. From the size of screen 34, the size of the image of the ends of fibers 14a–14f necessary to permit the required number of raster lines to be disposed in each of zones 41–48 of screen 34, and the overall optical gain provided by lenses 16 and 30, the appropriate size of the end of fibers 14a–14f may be determined. The ends of fibers 14a–14f are generally round. However, other shapes, such as square or hexagonal, may be used if desired.

For one particular embodiment, round ends of fibers 14a–14f, each having a diameter of about 9 microns ($9 \times 10^{-6}$ meters), a 1:1 image ratio from the input image plane (i.e. reverse focal point) of lens 16 to the output image plane (i.e. forward focal point) of lens 30 at which screen 34 is disposed, and screen 34 having a rectangular image area of 11.2 mm vertical by 15.4 mm horizontal (i.e. 19 mm diagonal with a 3:4 aspect ratio) were used. These fibers 14a-14f have a small numerical aperture of 0.1 which produces about a 10 mm diameter collimated output from lenses 16 and 18 as represented by margins 21 and 23 (FIG. 3). Further, ends of fibers 14a-14f are separated along a line from each other by one eighth (i.e. one divided by the number of zones of screen 34) of the height of the image plane (e.g. height of screen 34).

Emission of modulated light from the end of each of fibers 14a-14f and appropriate movement of vertical scan mirror 25 and horizontal scan mirror 27 (FIG. 1) are coordinated by synchronizing means (not shown) as is known in the art. At the beginning of line 1 of the raster of zone 41 and at the beginning of corresponding first raster lines of zones 42-48, mirror 25 and 27 are oriented so that the light rays from ends of fibers 14a-14f are directed to the beginning of the first line of the raster in the upper left corner of zones 41-48, respectively. As horizontal mirror 27 rotates, or begins to oscillate, the light rays from the ends of fibers 14a-14f scan to the right along the first line of the raster of zones 41-48.

At the end of the sweep of the first line of the raster of zones 41-48, the light emitted from the ends of fibers 14a-14f is turned off or blanked, mirror 27 is repositioned to be able to direct the light from ends of fibers 14a-14f to the beginning of a scan line for zones 41-48, and mirror 25 is indexed, or rotated, so that the third line (for an interleaved display) of each raster of zones 41-48 is ready to be scanned. The process continues scanning lines until all the odd lines of a field are sequentially scanned. At the end of the scan of the last odd line of the field, mirrors 25 and 27 are appropriately oriented so that the second line (i.e. first even line) of each zone 41-48 is ready to be scanned. Sequential scanning of the even lines continues until the last even line of each zone 41-48 is scanned, after which time mirrors 25 and 27 are arranged so that the first line (and subsequent odd lines) of zones 41-48 is ready to be scanned. Alternating sequential odd and even lines continue to be scanned to produce respective odd and even fields of video. An odd and corresponding next even video field combine to produce one frame of video as is known in the art.

Alternatively, the first line of the raster of each zone 41-48 may be scanned from left to right, and at the end of the line, vertical mirror 25 may be indexed or rotated so that light from the ends of fibers 14a-14f will be directed at the end (left side) of the second (i.e. first even) line of each zone 41-48. The second line of zones 41-48 may then be scanned from right to left, that is, opposite the direction of scan of the first line. At the end of the scan of the second line, mirror 25 may be indexed so that the light from the ends of fibers 14a-14f will be directed at the beginning of the third (i.e. second odd) line of each zone 41-48 in preparation for scanning the third line of the raster of each zone 41-48 from left to right. This scanning pattern may be continued so that all lines of a frame of the image to be displayed on screen 34 are sequentially scanned odd lines being scanned from left to right and even lines being oppositely scanned from right to left.

In addition, as herein before described, when a sinusoidal reference voltage, such as may be connected to horizontal scan means 26 for controlling mirror 27, is employed, it is preferable to use only the central portion of the sinusoid with appropriate blanking at the end of a sweep, which provides a more linear scan sweep. Further, the total number of lines of the overall image displayed on screen 34 is not significant for the present invention.

One benefit of dividing the image to be displayed into a plurality of zones with a separate light source for scanning each zone is that the overall video bandwidth requirements are reduced. For instance, in a 1000 line image divided into eight zones, vertical scanning mirror 25 need only be indexed to cover 125 lines, or one eighth the vertical angle subtended by screen 34, whereas without dividing the image, mirror 25 would have to be indexed to cover 1000 lines. Further, since the horizontal scan mirror 27 need only scan 125 lines for the example cited, rather than 1000 lines, the horizontal bandwidth is decreased by about one-eighth. Also, reducing the horizontal bandwidth produces more available luminance for the display since the dwell time for each pixel is increased because the horizontal scan does not have to move as rapidly as a single scan source to display a frame of the image.

The vertical scan angle excursion requirements are reduced due to ends of fibers 14 being separated by one-eighth of the vertical dimension of the raster on screen 34 to be scanned. That is, one fiber is assigned to each zone. Physical limitations of the electro-mechanical scanning means used, such as the maximum rate that an oscillating scanning mirror can change direction or the maximum rotational rate that can be readily accommodated without undue gyroscopic and/or high-pitched noise side effects, will place a practical limitation on the effective number of zones that can be used.

Figure 7:
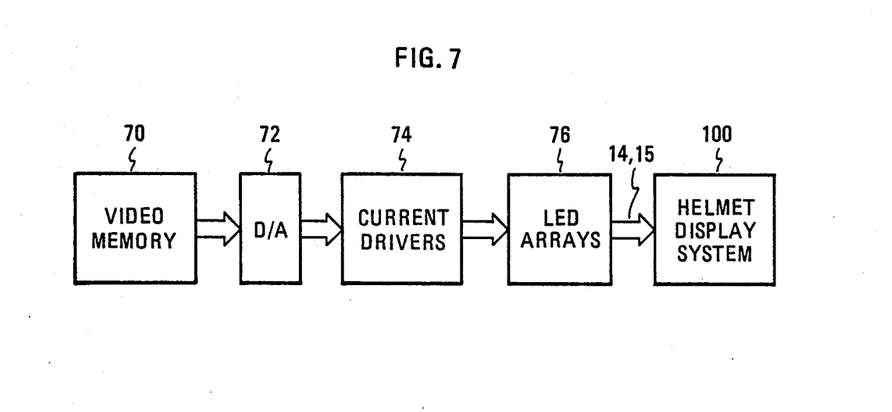
FIG. 7 is a block diagram of image generation circuitry useful with the present invention.

Referring to FIG. 7, a block diagram of image generation circuitry useful with the present invention is shown. Video memory 70 may be part of an image generation system (not shown) that produces and then stores in memory 70 appropriate image information in response to the orientation signal from head tracker means 50 (FIG. 1). A representative image generation system is disclosed and claimed in U.S. Pat. No. 4,727,365, assigned to the present assignee.

The red, green and blue components of the image information stored in video memory 70 are partitioned into, or assigned, a respective plurality of sections for each eye, each section corresponding to a respective one of zones into which the ultimate image to be displayed on screen 32 and 34 (FIG. 1) is divided. The output from the partitions of video memory 70 (forty-eight for screen 32 and 34 having eight zones each), which constitute the output of memory 70, are connected to corresponding inputs of digital to analog converter converter (D/A) 72. D/A converter 72 may be a single unit or a respective plurality of units corresponding to and having an input respectively connected to an output of video memory 70. An output from each section of D/A converter 72 is connected to a respective input of a current driver 74. Current drivers 74 produce a relatively high current (say about fifty milliamperes) that is modulated in response to the analog signal from D/A converter 72 supplied thereto.

The outputs from currents drivers 74, having the relatively high modulated current available thereat, are connected to an input of a respective one of a plurality of light emitting diode (LED), or solid state, arrays 76. Each of the plurality of LED arrays 76 includes at least one red, green and blue LED, and preferably two blue LED's. The modulated light output emitted from each of LED arrays 76 in response to the current provided thereto from corresponding current drivers 74 is funnelled into a fiber optic waveguide, or cable, of the plurality of cables 14 and 15 for use by helmet display system 100. For the example embodiment used herein, eight LED arrays supply respective ones of the plurality of cables 14 and another eight LED arrays 76 supply respective ones of the plurality of cables 15 with modulated lights signals.

Alternatively, LED arrays 76 may be replaced by corresponding red, green and blue gas or solid state laser arrays that supply modulated light signals to respective ones of the plurality of cables 14 and 15. If laser arrays are used LED drivers 74 are not required.

Video memory 70, D/A converters 72, current drivers 74 and LED arrays 76 may be located off helmet 10 (FIG. 1). Helmet 10 would have the plurality of cables 14 and 15, power and synchronization lines for vertical and horizontal scanning means 24 and 26, and power and a signal line for the orientation signal or head-tracker means 50 (FIG. 1), which all may be preferably arranged in a single bundle, connected to helmet 10, thus rendering helmet 10 along with helmet display system 100 relatively light weight.

For an embodiment of the present invention having eight vertical zones for screen 32 and 34 (FIG. 1) and which includes LED arrays 76 each having one red, one green and two blue LED's, a total of sixty-four current drivers 74 and forty-eight LED arrays 76 are required. That is, 2 eyes×8 scan lines per eye×4 LED's per scan line equals 64 current drivers. Only one set of sixteen D/A converters 72 is needed for the blue path since each output of the blue D/A converter 72 can be supplied to both blue LED's of a corresponding LED array 76.

Thus has been illustrated and described a helmet-mountable display system that is wide-angled, lightweight and inexpensive that provides a full color, high resolution image to a viewer. Further shown and described is a helmet-mountable image display system having an electro-mechanical scanning system wherein any scan anamoly affects each eye's image equally to assure registration of the images and further having an electro-mechanical scanning system incorporating multiple simultaneous scan lines for reducing video bandwidth and physical scan angle requirements.

While only certain preferred features of the invention have been shown by way of illustration, many modifications and changes will occur to those skilled in the art. It is to be understood that the appended claims are intended to cover all such modifications and changes as fall within the true spirit and scope of the invention.

I claim:

1. A helmet mountable display system for displaying a first raster-scanned image to an observer in response to a first plurality of light source means, each of the first plurality of light source means for supplying a respective first light signal having a respective first predetermined size, the display system comprising:

first input lens means having an input and an output, the input of the first input lens means optically coupled to the first plurality of light source means for receiving each first light signal, the first input lens means for providing a first collimated light pattern at the output of the first input lens means in response to each first light signal supplied to the input of the first input lens means;

a first deflecting surface moveable about a first axis, the first deflecting surface for deflecting the first collimated light pattern in a first direction along a first predetermined optical path;

a second deflecting surface moveable about a second axis and optically coupled to the first deflecting surface, the second deflecting surface for deflecting the deflected first collimated light pattern received from the first deflecting surface in a second direction along the first predetermined optical path;

first output lens means having an input and an output and optically coupled to receive the deflected first collimated light pattern deflected from the second deflecting surface, the first output lens means focusing the deflected first collimated light deflected from the second deflecting surface;

screen means optically coupled to the output of the first output lens means and disposed at the image plane of the first output lens means, the screen means for displaying the image of each of the first light signals and further for displaying a first raster scanned image when the first and second deflecting surfaces are moving in a predetermined pattern, the first raster scanned image having a first plurality of zones, each of the first plurality of zones scanned in response to a corresponding one of the first plurality of light source means; and visor display means, the visor display means having a visor surface viewable by the observer, the visor surface optically coupled to the screen means for presenting the first raster displayed image to the observer.

2. The display system as in claim 1, further including relay lens means optically coupled between the screen means and the surface, the relay lens means visor for transporting the image from the screen means to the surface of the visor.

3. The display system as in claim 1, wherein the image of the first light signals is scannable in a predetermined raster, the first deflecting surface providing the vertical scan when oscillating about the first axis and the second deflecting surface providing the horizontal scan when oscillating about the second axis.

4. The display system as in claim 1, wherein the image of the first light signals is scannable in a predetermined raster, the first deflecting surface providing the horizontal scan when oscillating about the first axis and the second deflecting surface providing the vertical scan when oscillating about the second axis.

5. The display system as in claim 1, wherein the first plurality of light source means includes a respective first optical wave guide for each of the first plurality of light source means and further wherein an end of each of the first optical wave guide supplies the respective first light signal, the size of the end for determining the predetermined size of the corresponding light signal.

6. The display system as in claim 5, wherein the number of first optical wave guides is eight.

7. The display system as in claim 1, further including first redirecting means disposed in the optical path between the first input lens means and the first deflecting surface, the first redirecting means for redirecting the first collimated light pattern from the output of the first input lens means in a first predetermined direction onto the first deflecting surface for shortening the straight line optical path length from the first input lens means to the screen means.

8. The display system as in claim 5, wherein the combination of the first input and first output lens means provide a 1:1 image ratio between the size of one of the first light signals and the image of the one of the first light signals on the screen means.

9. The display system as in claim 1, the display system further for displaying a second raster-scanned image in response to a second plurality of light source means, each of the second plurality of light source means for supplying a respective second light signal having a respective second predetermined size, the display system further comprising:

second input lens means having an input and an output, the input of the second input lens means optically coupled to the second plurality of light source means for receiving the second light signals, the second input lens means for providing a second collimated light pattern at the output of the second input lens means in response to the second light signals supplied to the input of the second input lens means; and second output lens means having an input and an output and optically coupled to receive the deflected second collimated light pattern deflected from the second deflecting surface, the second output lens means for focusing the deflected second collimated light pattern deflected from the second deflecting surface; wherein the first deflecting surface further for deflecting the second collimated light pattern in a first direction along a second predetermined optical path, the second deflecting surface further for deflecting the deflected second collimated light pattern received from the first deflecting surface in a second direction along the second predetermined optical path, and the screen means further optically coupled to the output of the second output lens means, the screen means further for displaying the image of each of the second light signals and further for displaying a second raster scanned image when the first and second deflecting surfaces are oscillating, the second raster scanned image having a second plurality of zones, each of the second plurality of zones scanned in response to a corresponding one of the second plurality of light source means, and the visor surface further for presenting the second raster displayed image to the observer, wherein the first and second raster scanned images are presented to respective eyes of the observer so that the observer can perceive a stereoscopic image.

10. The display system as in claim 9, the helmet having a left and right hemisphere separated along a meridian and respectively corresponding to the left and right side of the observer wearing the helmet, wherein the first input lens means and the second output lens means are fixedly attached to the right hemisphere of the helmet, the second input lens means and the first output lens means are fixedly attached to the left hemisphere of the helmet, the first and second deflecting surfaces are fixedly attached to the helmet such that the first and second deflecting surfaces are disposed along the meridian, and the screen means fixedly attached to the helmet, the screen means including first and second display screens, the first display screen disposed on the side of the left hemisphere for presenting an image to the left eye of the observer and the second display screen disposed on the side of the right hemisphere for presenting an image to the right eye of the observer, the first and second input lens means disposed so that the first and second collimated light patterns cross each other while passing between the first and second deflecting surfaces such that the image from the first plurality of light source means is displayed on the first display screen and the image from the second plurality of light source means is displayed on the second display screen.

11. The display system as in claim 10, wherein the first and second display screens include a respective first and second rear projection screen, wherein the visor surface for displaying the image from the first and second rear projection screen.

12. The display system as in claim 10, further including second redirecting means disposed in the optical path between the second input lens means and the first deflecting surface, the second redirecting means for redirecting the collimated light pattern from the output of the second input lens means in a second predetermined direction onto the first deflecting surface for shortening the straight line optical path length from the second input lens means to the screen means.

13. A method for generating a raster scanned image from video information for defining the image, comprising:

modulating a respective light signal for each of a predetermined plurality of contiguous zones of the image in response to a respective predetermined portion of the video information for forming respective modulated light signals;

collimating the modulated light signals;

deflecting the collimated modulated light signals by a first moveable deflector surface in a first predetermined direction for forming first deflected light signals;

deflecting the first deflected light signals by a second moveable deflector surface in a second predetermined direction for forming second deflected light signals, respective ones of the second deflected light signals indicative of a respective predeterminedly positioned line for each of the zones; and focusing the second deflected light signals, wherein the focused second deflected light signals are representative of the raster scanned image.

14. The method as in claim 13, wherein the number of zones is eight.

15. The method as in claim 13, wherein the number of lines for each zone is equal and the step of deflecting the first deflected light signals further includes deflecting the first deflected light signals such that respective second deflected light signals scan a predeterminedly identified corresponding line for each of the zones.

16. The method as in claim 15, wherein the predeterminedly identified corresponding line includes sequential lines of each zone.

17. The method as in claim 16, further including the step of scanning a line in one direction and the next sequential line in the opposite direction.

18. The method as in claim 15, wherein the predeterminedly identified corresponding line includes sequential odd lines of each zone followed by sequential even lines of each zone.

19. Visual display apparatus for generating a raster scanned image from video information for defining the image, the raster scanned image having a plurality of contiguous zones, the apparatus comprising:

a plurality of light source means, each light source means for supplying a respective modulated light signal to a corresponding one of the plurality of contiguous zones, each light signal modulated in response to a respective predetermined portion of the video information;

collimation means having an input optically coupled to the plurality of light source means, the collimation means for providing collimated light signals;

a first deflecting surface, the first surface moveable about a first axis;

a second deflecting surface, the second surface moveable about a second axis; and focusing means having an input optically coupled to the second deflecting surface for receiving collimated light signals deflected from the second deflecting surface, the focusing means for focusing the collimated light signals received from the second deflecting surface such that a respective focused light signal scans a corresponding zone of the plurality of contiguous zones, the first deflecting surface coupled in optical flow communication with the collimation means so that the collimated light signals are incident on the first surface and further disposed with respect to the second deflecting surface such that collimated light signals incident on the first surface are deflected onto the second surface, wherein the focused light signals from the focusing means are representative of the raster scanned image when the first and second surface are moving in a predetermined pattern.

20. The apparatus as in claim 19, wherein the first surface forms the horizontal scan and the second surface forms the vertical scan of the raster scanned image.

21. The apparatus as in claim 19, wherein the first surface forms the vertical scan and the second surface forms the horizontal scan of the raster scanned image.

22. The apparatus as in claim 19, further comprising a plurality of fiber optic light guides, each of the plurality of light guides coupled at one end to a respective one of the plurality of light source means for receiving a respective modulated light signal and the other end of the plurality of light guides for providing a respective modulated light signal to the collimating means.

23. The apparatus as in claim 22, wherein the plurality of light source means includes a respective laser.

24. The apparatus as in claim 22, wherein the plurality of light source means includes a respective red, blue and green light emitting diode.

25. The apparatus as in claim 24, wherein the plurality of light source means includes a respective red, green and two blue light emitting diodes.

26. The apparatus as in claim 22, wherein the collimating means and the focusing means respectively include convex-convex lens means.

27. The apparatus as in claim 19, wherein the plurality of light source means includes a first predetermined number of light sources for presenting a first raster scanned image to the right eye of an observer and further wherein the plurality of light source means includes a second predetermined number of light sources for presenting a second raster scanned image to the left eye of an observer, whereby a stereoscopic display may be viewed by the observer when both the first and second raster scanned image are presented to the observer.

28. The apparatus as in claim 27, further including a helmet having a visor display system wherein the first and second raster scanned image are presented to the observer when wearing the helmet from a surface of the visor display system.

* * * * *